United States Patent
Mellick

(10) Patent No.: US 9,667,349 B1
(45) Date of Patent: May 30, 2017

(54) DYNAMIC RANGE EXTENSION OF HETERODYNE FIBER-OPTIC INTERFEROMETERS VIA INSTANTANEOUS CARRIER MEASUREMENT

(71) Applicant: David Mellick, Hayden, ID (US)

(72) Inventor: David Mellick, Hayden, ID (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/871,617

(22) Filed: Sep. 30, 2015

Related U.S. Application Data

(60) Provisional application No. 62/148,042, filed on Apr. 15, 2015.

(51) Int. Cl.
| | |
|---|---|
| *H04B 10/64* | (2013.01) |
| *H04B 10/61* | (2013.01) |
| *H04B 10/079* | (2013.01) |

(52) U.S. Cl.
CPC ..... *H04B 10/6164* (2013.01); *H04B 10/0795* (2013.01); *H04B 10/615* (2013.01); *H04B 10/64* (2013.01)

(58) Field of Classification Search
USPC ......................................................... 356/450
See application file for complete search history.

(56) References Cited

U.S. PATENT DOCUMENTS

| | | | | |
|---|---|---|---|---|
| 2009/0122319 A1* | 5/2009 | Ronnekleiv | ............ | G01H 9/004 356/477 |
| 2010/0135433 A1* | 6/2010 | Maeda | ................ | H04L 27/2602 375/295 |

OTHER PUBLICATIONS

Songnian Fu,Photonic Instantaneous Frequency Measurement Using Optical Carrier Suppression based DC Power Monitoring,978-1-4244-8939-8/11/ © 2011 IEEE, pp. 85-86.*

* cited by examiner

*Primary Examiner* — David Payne
*Assistant Examiner* — Omar S Ismail
(74) *Attorney, Agent, or Firm* — Dave A. Ghatt

(57) ABSTRACT

A method of dynamic range extension for heterodyne fiber-optic Interferometers, and more particularly towards the use of instantaneous carrier to extend the dynamic range of heterodyne fiber-optic interferometers. The method includes the providing of a heterodyne fiber-optic interferometer having a demodulator and an associated carrier frequency. The method also includes the determining of demodulator excessions. The detecting of the demodulator excessions and the determining of an appropriate correction factor is based on information from the instantaneous carrier frequency. The method also includes the introduction of the appropriate correction factor to the demodulator.

9 Claims, 6 Drawing Sheets

DYNAMIC RANGE EXTENSION OF HETERODYNE FIBER-OPTIC INTERFEROMETERS VIA INSTANTANEOUS CARRIER MEASUREMENT

CROSS-REFERENCE TO RELATED APPLICATIONS

This application claims the benefit of U.S. Provisional Application No. 62/148,042, filed Apr. 15, 2015, which is incorporated herein by reference.

This application is related to U.S. provisional patent application No. 62/148,054, filed Apr. 15, 2015, hereby incorporated herein by reference, entitled "Digital I/Q Reprocessing Demodulator (DIRD)" by inventor David Mellick, who is also the sole inventor of the instant patent application.

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to dynamic range extension of heterodyne fiber-optic Interferometers, and more particularly towards the use of instantaneous carrier to extend the dynamic range of heterodyne fiber-optic interferometers.

BACKGROUND

Much of the research in the field of fiber-optic sensors dates back more than 30 years. In that time, numerous types of fiber-optic sensor technologies were developed. Fiber-optic sensors have been designed to sense various parameters of light. These include intensity changes, polarization states, and wavelength shifts. Their popularity is due to their numerous potential benefits. These benefits include EMI immunity, remote interrogation capabilities, and the ability to multiplex hundreds of sensors in both time and wavelength on a single fiber. One of the most popular fiber-optic technologies is in the field of interferometers.

Fiber-optic interferometers provide the highest sensitivity and widest dynamic range of any available fiber-optic sensor technology. They are also capable of remote interrogation and can be multiplexed into large-channel-count arrays. Because of these characteristics, fiber-optic interferometers are generally well suited for applications such as large acoustic and vibration sensing arrays. However, for some applications, even the wide dynamic range of the interferometer is still insufficient.

The wide dynamic range of fiber-optic sensors, however, is still insufficient in a number of highly desirable applications. This is partially evident by the number and type of fiber-optic sensor systems currently deployed in real-world applications. Despite the fact that the majority of the research in the field was conducted in the 1980's and 1990's, only a few select fiber-optic sensor systems have reached production stage. These systems all have modest dynamic range requirements. There are currently no large-scale fiber-optic interferometric sensor systems in use by the research and development community, despite their significant benefits.

SUMMARY

In one aspect, the invention is a method of extending the dynamic range in a heterodyne fiber-optic interferometer via an instantaneous carrier measurement. In this aspect, the method includes the providing of a heterodyne fiber-optic interferometer having a demodulator and an associated carrier frequency. The method also includes the determining of demodulator excessions, and the determining an appropriate correction factor based on the detected demodulator excession. According to the invention, each of the detecting of the demodulator excessions and the determining of an appropriate correction factor is based on information from the instantaneous carrier frequency. The method also includes the introduction of the appropriate correction factor to the demodulator.

BRIEF DESCRIPTION OF THE DRAWINGS

Other features will be apparent from the description, the drawings, and the claims.

DETAILED DESCRIPTION

Figure 1A:
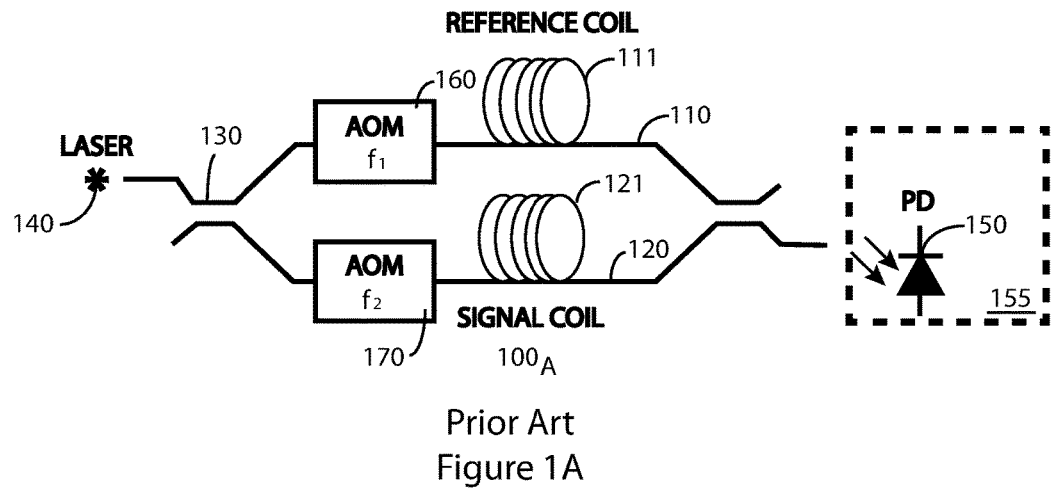
FIGS. 1A, 1B, and 1C are exemplary prior art illustrations of heterodyne fiber-optic interferometers that are applicable to the outlined method.
Figure 1B:
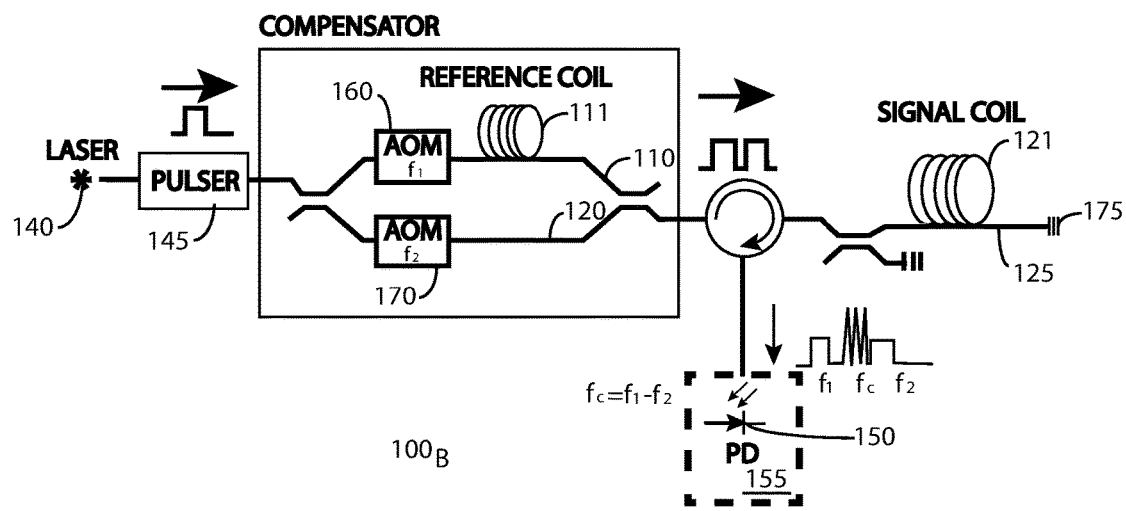
Figure 1C:
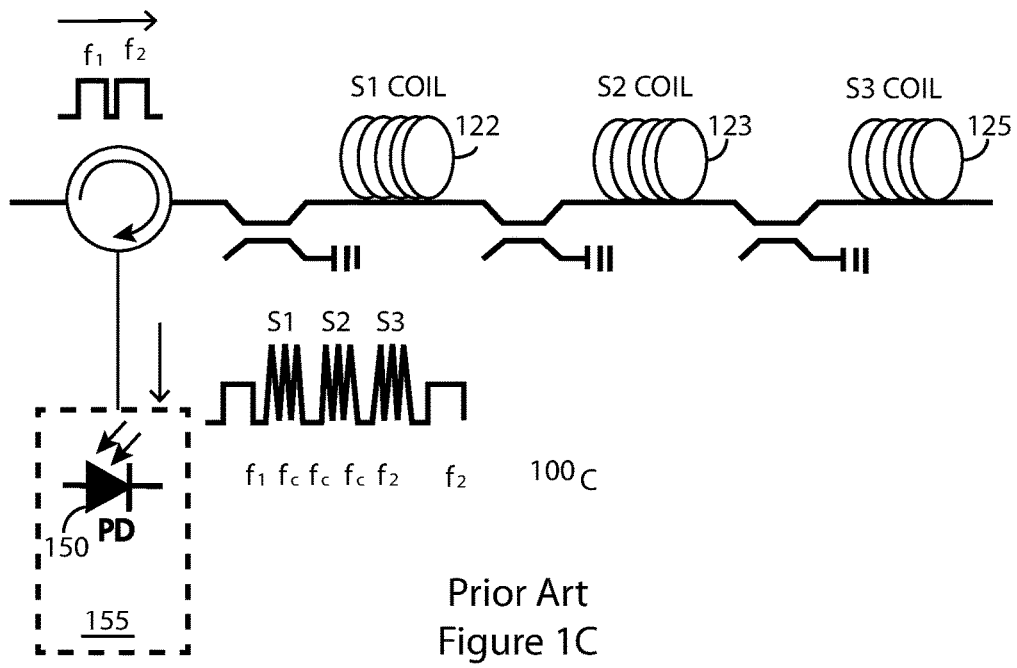

The invention is directed towards the dynamic range of heterodyne fiber-optic interferometers. As outlined below, in heterodyne fiber-optic interferometers, phase excessions at the input of the demodulator introduce deterministic errors in the demodulated output. According to this invention, the dynamic range of heterodyne fiber-optic interferometers may be extended by negating or correcting these errors in the demodulated output. FIGS. 1A, 1B, and 1C are exemplary prior art illustrations of heterodyne fiber-optic interferometers 100, that are applicable to the invention outlined herein. FIG. 1A shows a heterodyne modulated Mach-Zehnder fiber-optic interferometer $100_A$. FIG. 1B shows a pulsed heterodyne Michelson interferometer $100_B$. FIG. 1C shows an In-line Michelson Time Division Multiplexing (TDM) fiber-optic interferometer $100_C$. It should be noted that the illustrations of FIGS. 1A, 1B, and 1C are merely examples of heterodyne fiber-optic interferometers 100, and other known designs are also applicable to this invention.

Returning to FIG. 1A, the interferometer $100_A$ includes two coils of fiber. One coil 111 is on reference arm 110, and the other coil 121 is on signal arm 120. The interferometer $100_A$ also includes two-directional fiber-optic couplers 130, a light source 140. The interferometer $100_A$ also includes and one or more photodetectors 150. The photodetectors 150 are a part of demodulator 155, which is schematically illustrated. The demodulator 155 may be a known demodulator having known electronic components. The light source 140 is typically a long coherence laser such that when the light passes through the fiber arms and recombines back at the photodetector the two beams will mix coherently. The heterodyne modulated Mach-Zehnder also includes Acousto-Optic Modulators (AOM) (160, 170) on each arm (110, 120) of the interferometer $100_A$. Each AOM is designed to shift the frequency of the incoming light by the frequency of the drive signal. The AOMs (160, 170) are driven at frequencies $f_1$ and $f_2$ such that a resulting carrier frequency of $f_c=f_1-f_2$ is generated in the photodetector current, FIG. 1B shows the pulsed heterodyne Michelson interferometer $100_B$. Like elements of interferometer 1008 are numbered as outlined above. In this configuration, the signal coil 121 is removed from the Mach-Zehnder position and is placed on an arm 125 at some remote location. Mirrors 175 are added to the end of the signal coil 121, creating the fiber-optic Michelson interferometer $100_B$. Optical pulses are used to interrogate the remote Michelson interferometer $100_B$. The pulses are generated by the addition of an optical pulsing unit 145 placed after the laser 140. Electro-Optic Modulators (EOMs), AOMs, or Semiconductor Optical Amplifiers (SOAs) can all be used for pulse generation. In this arrangement driven frequencies $f_1$ and $f_2$ also result in a carrier frequency of $f_c=f_1-f_2$. FIG. 1B also shows photodetectors 150 being a part of demodulator 155. As stated above, the demodulator 155 may be a known demodulator having known electronic components.

FIG. 1C shows an In-line Michelson TDM fiber-optic interferometer $100_C$. The arrangement of FIG. 1C is similar to that of the illustration of FIG. 1B, with additional sensor coils 122, and 123 on arm 125. In this arrangement driven frequencies ft and $f_2$ also result in a carrier frequency of $f_c=f_1-f_2$. Time division multiplexing as illustrated in FIG. 1C is achieved by concatenating the sensor coils (121, 122, 123) together, separated by directional couplers with one end mirrored. The coupler ratios are carefully selected such that the amount of light reflected from each coupler is approximately equal. Each sensor coil (121, 122, and 123) produces one burst of the heterodyne carrier. By properly gating the heterodyne bursts in time, the demodulator can recover the phase signal of interest from the individual sensors. FIG. 1C also shows photodetectors 150 being a part of demodulator 155. As stated above, the demodulator 155 may be a known demodulator having known electronic components.

Figure 2:
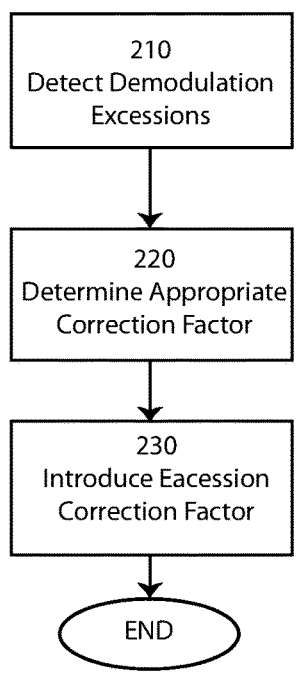
FIG. 2 is a schematic illustration, broadly outlining a process for extending the dynamic range of heterodyne fiber-optic interferometers, according to an embodiment of the invention.

FIG. 2 is a schematic illustration, broadly outlining the process 200 for extending the dynamic range of heterodyne fiber-optic interferometers. As stated above, the illustrations of FIGS. 1A, 1B, and 1C are examples of heterodyne fiber-optic interferometers 100 applicable for the dynamic range extension process. Other known designs are also applicable to this process 200. As stated above, in heterodyne fiber-optic interferometers 100, phase excessions at the input of the demodulator introduce deterministic errors in the demodulated output. According to this invention, the dynamic range of heterodyne fiber-optic interferometers may be extended by negating or correcting these errors in the demodulated output. As outlined below, this is accomplished by using instantaneous carrier frequency measurements.

According to the process 200, step 210 is the detecting of demodulator excessions. Step 220 is the determination of an appropriate correction factor based on the detected demodulator excession, wherein each of step 210, i.e., the detection of the demodulator excessions, and step 220, i.e., the determination of the appropriate correction factor, is accomplished by obtaining this information from an instantaneous carrier frequency. As outlined below, there are several ways to obtain the desired information from the carrier frequency, and to use the carrier frequency information to determine a correction factor. The process 200 also includes step 230, the introduction of the excession correction factor to the standard demodulator, to mitigate errors, thereby extending the dynamic range of the heterodyne fiber-optic interferometer.

Figure 3:
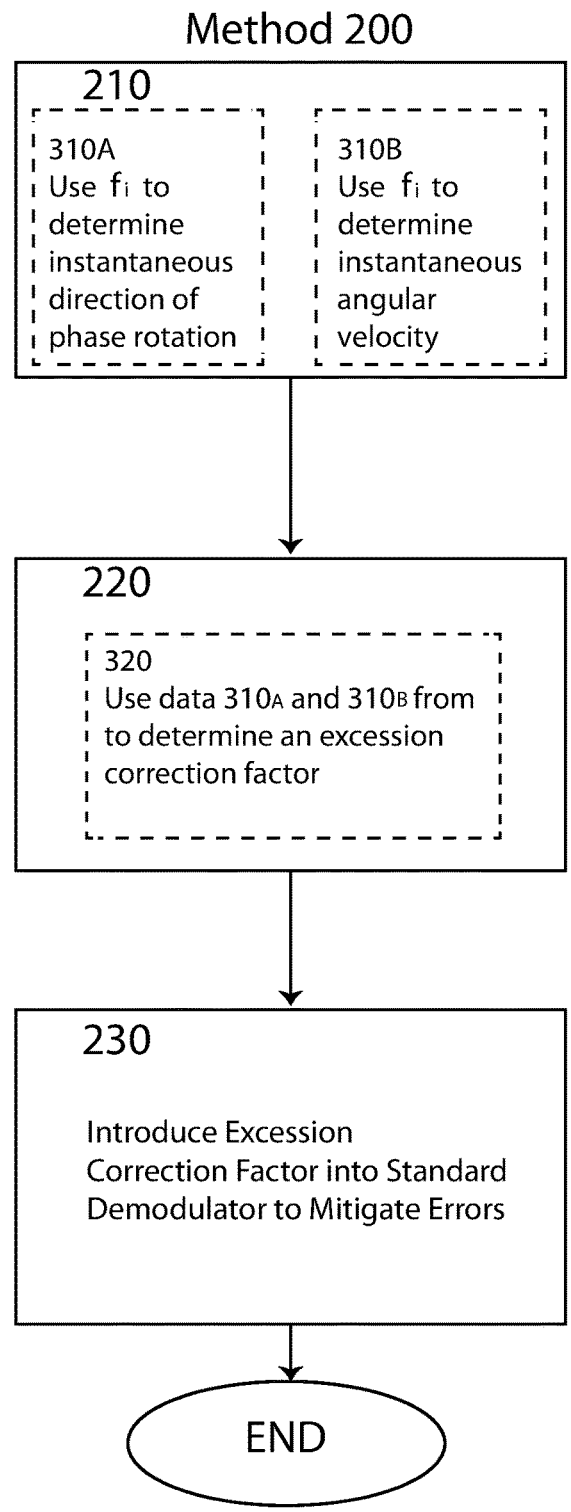
FIG. 3 is an exemplary flowchart showing a process for extending the dynamic range of heterodyne fiber-optic interferometers, utilizing the instantaneous frequency, according to an embodiment of the invention.

FIG. 3 is an exemplary flowchart showing a process 200 for extending the dynamic range of heterodyne fiber-optic interferometers, utilizing the instantaneous frequency, according to an embodiment of the invention. According to the embodiment of FIG. 3, the instantaneous frequency is used to detect demodulator excessions, and to determinate an appropriate correction factor based on the detected demodulator excession, as outlined in steps 210 and 220 in the flowchart of FIG. 2. This process of FIG. 3 is applicable to the heterodyne fiber-optic interferometers outlined in FIGS. 1B and 1C, i.e. interferometers $100_B$ and $100_C$. The process of FIG. 3 is particularly applicable to interferometer $100_C$, wherein the use of TDM reduces the available dynamic range, thereby presenting a method of offsetting some or all of lost dynamic range.

As shown in FIG. 3, step $310_A$ is using the instantaneous frequency $f_i$ to determine the instantaneous direction of phase rotation. Step $310_B$ is using the instantaneous frequency $f_i$ to determine the instantaneous angular velocity. It should be noted that steps $310_A$ and $310_B$ each perform and accomplish the requirements of step 210, outlined above, and shown in FIG. 2.

Step 320 is using the data from steps $310_A$ and $310_B$ to determine an excession correction factor. In other words, at step 320, the acquired instantaneous direction of phase rotation data, and instantaneous angular velocity data, are used to determine the excession correction factor. It should be noted that as shown in FIG. 3, step 320 performs and accomplishes the requirements of step 220, outlined above. FIG. 3 shows step 230 being the introduction of the correction factor of step 320 to the standard demodulator to mitigate errors. This also provides an effective and efficient dynamic range extension of the heterodyne fiber-optic interferometer.

Returning to step $310_A$, the process of using the instantaneous frequency $f_c$ to determine the instantaneous direction of phase rotation is herein outlined. In the standard demodulation process, the direction of phase rotation can only be assumed. A shortest path traveled algorithm is used to predict the current direction of rotation. If, however, the phase advances by more than $\pm\pi$ radians between samples, this assumption will be false, and the demodulated output will be in error, and this will introduce an apparent phase reversal in the output.

The instantaneous carrier frequency can, however, provide information regarding the actual instantaneous direction of rotation. The instantaneous direction of rotation can be determined from the instantaneous carrier frequency in equation 1.1.

$$f_i(t) = f_c + (1/2\pi)(d\phi_s(t)/dt) \quad (1.1)$$

For sinusoidal phase modulation of $\phi_s(t) = A_s \sin(2\pi f_s t)$, equation (3.1) becomes:

$$f_i(t) = f_c + A_s f_s \cos(2\pi f_s t) \quad (1.2)$$

Since the value of $f_c$ is fixed, and it has been shown that the instantaneous carrier frequency $f_i$ may be measured, this allows the value of $A_s f_s \cos(2\pi f_s t)$ to be computed. If $A_s f_s \cos(2\pi f_s t) > 0$ or $(f_i > f_c)$, then the angular phase rotation is determined to be in the positive direction. Likewise, when $A_s f_s \cos(2\pi f_s t) < 0$, or $(f_i < f_c)$, the angular phase rotation is in the negative direction. The instantaneous direction of rotation can therefore be determined simply by checking whether the nominal carrier frequency is greater than or less than the instantaneous carrier frequency.

Information regarding the actual direction of rotation eliminates the guessing of the standard demodulator output. According to the process of step 310$_A$, when the actual direction of rotation and the demodulated direction of rotation do not match, then an excession has been detected. Step 320 is using the data from step 310$_A$ to determine an excession correction factor. According to the process 200 of FIG. 3, when the actual direction of rotation is in the positive direction, then $2\pi$ correction factor must be added to the demodulated output to correct for the excession error. Likewise, when the direction of rotation is negative, then $-2\pi$ correction factor must be added. It should be noted that other processes, outlined below, may be used for phase excursions exceeding $\pm 2\pi$.

As shown in FIG. 3, the correction factor of step 320 is introduced to the standard demodulator to mitigate errors, as per step 230 of the method 200. This also provides and effective and efficient dynamic range extension of the heterodyne fiber-optic interferometer. The introduction of the correction factor determined in step 320 alone may be used to achieve a 6 dB dynamic range increase.

Returning to step 310$_B$ of FIG. 3, the process of using the instantaneous frequency $f_c$ to determine the instantaneous direction of phase rotation is herein outlined. As outlined above, determining the actual direction of phase rotation allows for correcting the first excession point of the demodulator where the phase shifts exceed $\pm \pi$. However, it may not correct for excessions that exceed $\pm 2\pi$. Correction of such excessions requires tracking of the instantaneous carrier frequency to determine the angular velocity. The instantaneous angular velocity can be used to estimate the magnitude of the phase shift between demodulation points. This will allow for determination of higher order $2\pi$ correction factors.

According to the process of step 310$_B$, the instantaneous angular velocity $\omega i$ can be derived from equation 1.3 for sinusoidal modulation.

$$\omega_i(t) = \omega_c + A_s \omega_s \cos(\omega_s t) \quad (1.3)$$

However, since the carrier frequency is removed from the equation during demodulation, the only angular velocity component that is of importance is that which is contributed by the input signal. This was shown previously to be simply the derivative of the input. Therefore, the instantaneous angular velocity of a sinusoidal signal $\omega_{is}$ according to the step 310$_B$ is:

$$\omega_{is}(t) = A_s \omega_s \cos(\omega_s t) \quad (1.4)$$

Since the units of $\omega_{is}$ are radians per second, when multiplied by the time step between demodulation sample points, an estimate can be obtained of the phase change between the two.

The accuracy of this estimate, however, is dependent on several factors. First, since the angular velocity of the signal is also sinusoidal in nature, the location at which the samples are taken is important. When the samples are taken in the linear part of the sinusoid, then the phase estimate will be much closer than for samples taken in the non-linear part of the curve. This leads to the second issue, which is the time step between samples. When the time step between samples is small, then the error will be small. When the time step is large, then the error will be large. Whether the time step is considered small or large depends on the frequency of the signal, relative to the demodulation rate. The higher the signal frequency, the higher the error in the estimate for a given sample rate. As outlined below, this effect imposes a frequency dependent limitation.

In general, multiplying the instantaneous angular velocity by the demodulation time step will result in a large error in the phase change estimate. As will be discussed later, some form of averaging of the instantaneous angular velocities must be utilized to improve the estimate. This averaging will reduce estimation error in the non-linear parts of the input signal, such as at inflection points. Provided that the signal's angular velocity is averaged over two or more points, a $2\pi$ excession correction factor may be calculated from equation 1.5, where n is the number of $2\pi$ that must be added or subtracted from the demodulated output. The plus or minus sign in the equation depends on the instantaneous direction of rotation, which was shown could be predetermined.

$$n = \text{floor}(f_{is\_avg}/f_{samp} \pm 1/2) \quad (1.5)$$

Therefore, step 320 is using the data from step 310$_B$ to determine an excession correction factor, by using equation 1.5, shown above. According to this method, by computing the average instantaneous angular velocity, an estimated excession correction factor can be obtained, which allows for phase excursions greater than $\pm 2\pi$. As shown in FIG. 3, the correction factor of step 320 is introduced to the standard demodulator to mitigate errors, as per step 230 of the method 200. This also provides and effective and efficient dynamic range extension of the heterodyne fiber-optic interferometer.

As outlined above, information obtained from the instantaneous carrier frequency can be used in a variety of ways to provide a high-end dynamic range increase. The method illustrated in FIG. 3 outlines one approach. However, because the instantaneous direction of rotation and the instantaneous angular velocity are derived from the instantaneous carrier frequency, the excession correction factors may also be determined directly from the carrier frequency.

Figure 4:
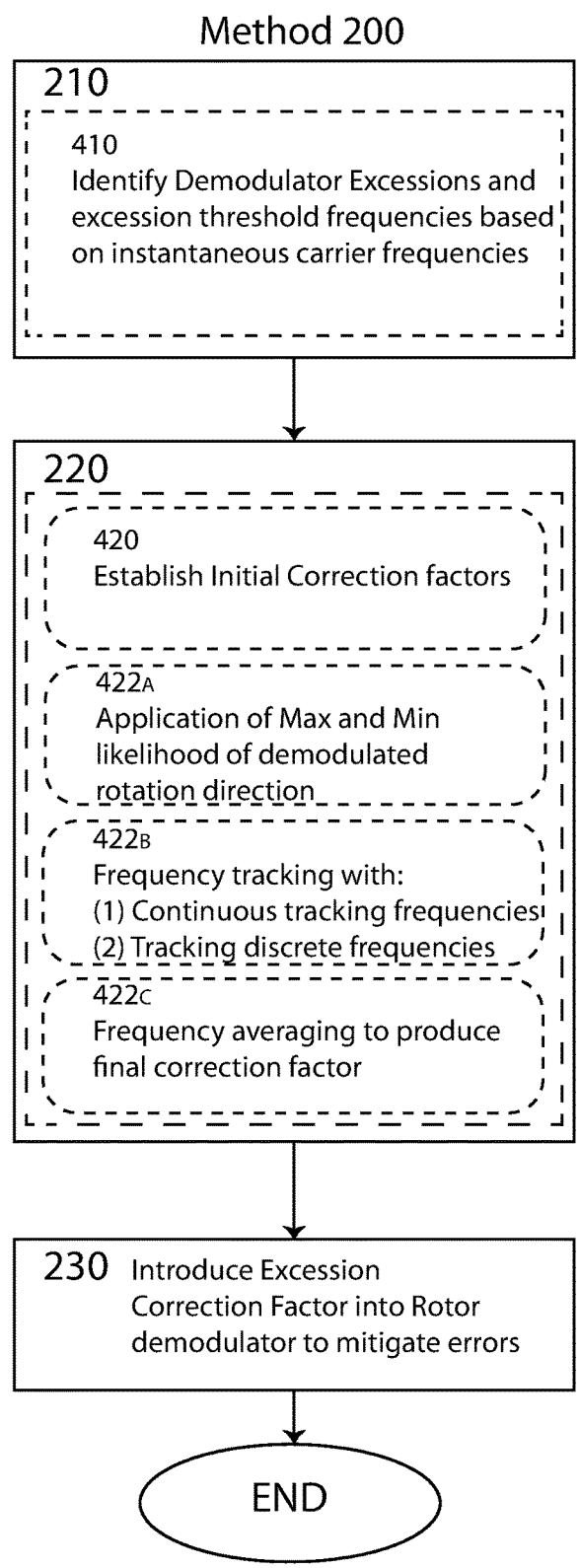
FIG. 4 is an exemplary flowchart showing a process for extending the dynamic range of heterodyne fiber-optic interferometers, utilizing the instantaneous frequency, according to an embodiment of the invention.

FIG. 4 is an exemplary flowchart showing a process 200 for extending the dynamic range of heterodyne fiber-optic interferometers, utilizing the instantaneous frequency, according to an embodiment of the invention. According to the embodiment of FIG. 4, the instantaneous frequency is used to detect demodulator excessions, and to determinate an appropriate correction factor based on the detected demodulator excession, as outlined in steps 210 and 220 in the flowchart of FIG. 2. This process of FIG. 4 is particularly applicable to the heterodyne fiber-optic interferometer outlined in FIG. 1B, i.e., the pulsed heterodyne Michelson interferometer 100$_B$, as well as the In-line Michelson TDM fiber-optic interferometer 100$_C$ of FIG. 1C. As outlined below, according to the process as outlined in FIG. 4, a dynamic range increase of more than 20 dB may be accomplished.

As shown in FIG. 4, step 410 is identifying demodulator excessions and excession threshold frequencies. The excession threshold frequencies are fixed based on the sample/interrogation/demodulation rate of the system. The excession threshold frequencies are the frequencies at occurrences of demodulator excessions. It should be noted that step 410 performs and accomplishes the requirements of step 210, outlined above, and shown in FIG. 2.

Step 420 is the establishment of initial correction factors, at the excession threshold frequencies at occurrences of demodulator excessions at step 410. Steps $422_A$, $422_B$, and $422_C$ each involve determining a more accurate correction factor. As outlined below steps $422_A$, $422_B$, and $422_C$ combine to produce a single correction factor, which is introduced at step 230 to the demodulator to mitigate errors. It should be noted that steps 420, $422_A$, $422_B$, and $422_C$ combined, perform and accomplish the requirements of step 220, outlined above, and shown in FIG. 2. FIG. 4 shows step 230 being the introduction of the final correction factor (from steps $422_A$, $422_B$, and $422_C$) to the standard demodulator to mitigate errors. This provides an effective and efficient dynamic range extension of the heterodyne fiber-optic interferometer.

As stated above, step 410 is the identification of demodulator excessions and excession threshold frequencies. The excession threshold frequencies are fixed based on the sample/interrogation/demodulation rate of the system. The instantaneous carrier frequency changes and is either greater than or less than the threshold frequency points. The angular velocity of an incoming signal associated with the instantaneous carrier frequency, is calculated by utilizing a sample rate times π. The sample rate times π is the fringe rate of the demodulator, and does not change. The angular velocity of the incoming carrier signal changes and if it exceeds the demodulator's fringe rate then that value is problematic and is noted as an excession. If on the other hand, the fringe rate is not exceeded, the phase of the incoming signal is determined through a standard I/Q demodulation process, and no correction factors are added to the determined phase.

An excession occurs at a fringe rate equal to $\pm\pi f_{samp}$. This peak fringe rate of the demodulator can be converted to an equivalent frequency by dividing by $2\pi$. Thus, the first excession of the demodulator will occur when the instantaneous carrier frequency deviates from the nominal frequency by $\pm F_{samp}/2$. It has also been shown that for each additional π increase in the input phase shift, the demodulated output will undergo an apparent phase reversal. The carrier frequencies at which these phase reversals occur are considered the excession threshold frequencies. The excession threshold frequencies can be found from equation 2.1, where $f_e$ is the instantaneous carrier frequency at the excession crossing.

$$f_e(m) = f_c + m/2(f_{samp}) \text{ for } m = \pm 1, \pm 2, \ldots \quad (2.1)$$

Figure 5:
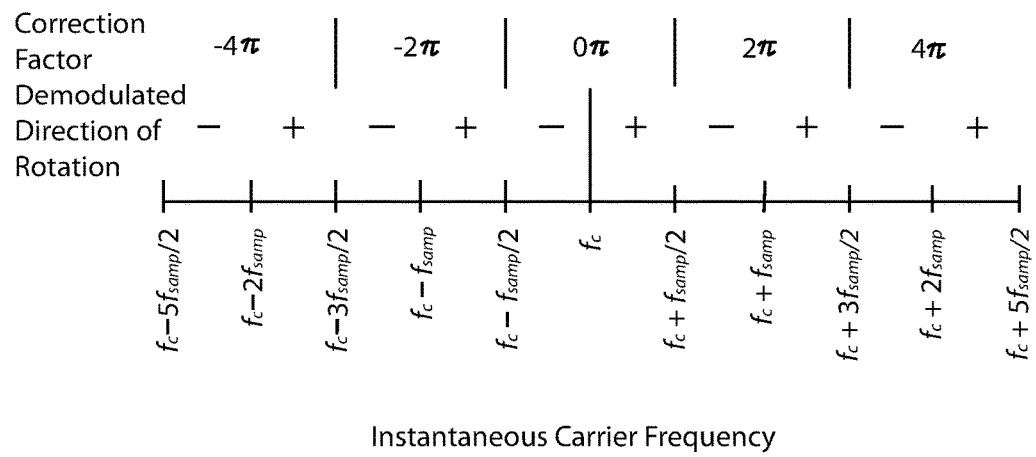
FIG. 5 is an exemplary graphical illustration of excession threshold frequencies, expected demodulated directions of rotation, and initial correction factors, according to an embodiment of the invention.

As stated above, step 420 is the establishment of initial correction factors, at the excession threshold frequencies. The excession threshold frequencies also help to define the optimal carrier frequencies or frequency bands within the system bandwidth to track. FIG. 5 is an exemplary graphical illustration of excession threshold frequencies, expected demodulated directions of rotation, and initial correction factors. The illustration of FIG. 5 is based on the dynamic range extension method of FIG. 4.

As shown in FIG. 5, the general approach to dynamic range extension is to select the correction factor based on where the measured instantaneous carrier frequency falls within the system spectrum. As stated above, what is selected at step 420 is an initial correction factor. As outlined below, there are three additional considerations that are used to improve upon the initial correction factor. These include: (a) the statistical likelihood of the demodulated direction of rotation, referenced in step $422_A$; (b) frequencies that are tracked, referenced in step $422_B$; and, (c) a frequency averaging approach, referenced in step $422_C$.

As stated above, step $422_A$ involves determining a more accurate correction factor. At step $422_A$ a maximum and minimum likelihood of demodulated rotational direction is applied, establishing maximum/minimum likelihood bins for the instantaneous carrier frequency, as outlined below. The maximum/minimum likelihood bins are established based on the system sample rate so measurements are not carried out or computed for each sample. The maximum and minimum likelihood of demodulated rotational direction may be described as the direction the demodulator determines if the instantaneous carrier signal has a constant angular rate between two phase measurements. In operation, the demodulator will always determine that the phase has advanced in either a positive or negative direction between samples. This determination may be correct or may be incorrect, depending on if an excession has occurred.

According to step $422_A$, when the input phase signal to the demodulator is near zero, the demodulated output will be a low level of phase noise centered around ±0 radians, and the instantaneous carrier frequency $f_i$ will remain close to the nominal value $f_c$. Under these conditions, the probability that the demodulator will experience a small positive rotation is equally likely to it experiencing a small negative rotation. If, however, a large phase signal is applied to the input, the likelihood of experiencing either a positive rotation or a negative rotation will no longer be equal when considering a small portion of the waveform. For example, with sinusoidal modulation, during the positive slopes of the waveform, the probability is highest for a positive rotation. On the negative slopes of the waveform, the probability will be highest for a negative rotation. At the maximum and minimum points of the waveform, the probabilities are again equal.

Of real interest in step $422_A$ is not the actual rotational probabilities of the waveform, but rather the probability of the demodulated output direction of rotation. Again, with no input signal to the demodulator, the demodulator is equally likely to produce an output with either a positive or a negative direction of rotation. When, however, sinusoidal modulation is considered, as the phase between demodulated points begins to increase in the positive direction, the probability of the demodulator producing a demodulated output with a positive direction of rotation also begins to increase. This likelihood continues to increase until the phase shift between samples reaches π/2 radians. This is the first maximum likelihood point of demodulated positive rotation. When the phase continues to increase further in the positive direction, the probability will begin to decline until it, again, reaches an equal likelihood at a phase shift of radians. This is at the first excession threshold point of the demodulator. As a result, even though the actual direction of rotation was in the positive direction, when the phase shift is just slightly greater than π, the demodulator will produce an output value approaching −π. Therefore, at the excession threshold frequencies, where the demodulated output phase reversals occur, the probability of the demodulator producing an output of positive direction is equally likely as a negative one.

Beyond the first excession threshold, when the input phase advances continue to increase in the positive direction, the probability of the demodulator producing a positive value will continue to decrease until it hits the positive rotation minimum likelihood point at a positive phase advance of $3\pi/2$. This is the point at which the demodulator is most likely to interpret this positive phase rotation as a negative rotation of $-\pi/2$. Additional increases in the positive rotational phase advances will see the probability of the demodulator producing a positive rotational value begin to increase. As the positive phase advances approach $2\pi$, the probabilities will again be equal at the second excession threshold. This pattern of maximum and minimum likelihood of demodulated rotational direction will continue to repeat for further phase increases in the given direction. A similar analysis may be conducted for the case of the negative rotational direction. The difference between the two cases is in where the maximum and minimum probabilities occur. The points of equal probability are the same for both cases and are located at the excession threshold frequencies.

Figure 6:
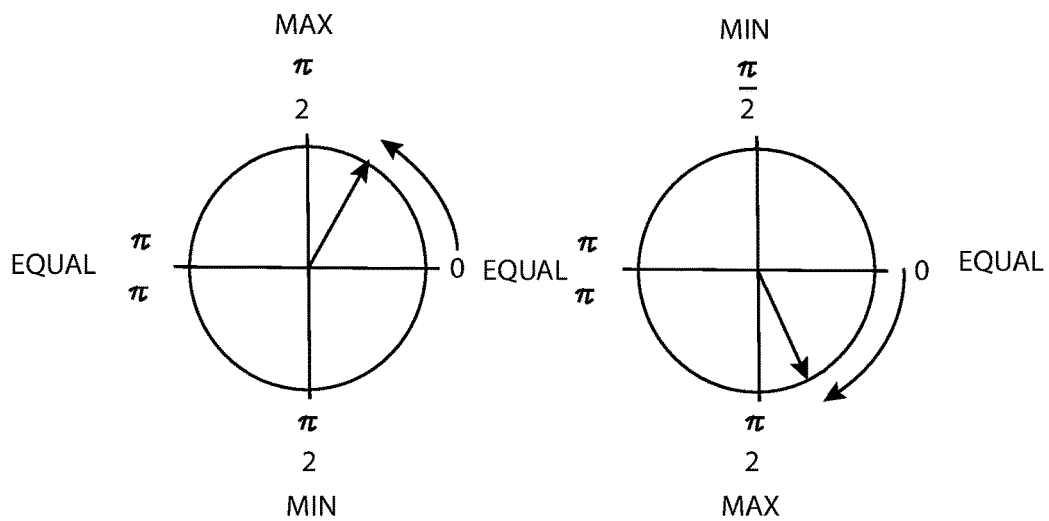
FIG. 6 is an exemplary graphical illustration of the probability of demodulated output direction of rotation given actual direction of rotation, according to an embodiment of the invention.

FIG. 6 is an exemplary graphical illustration of the probability of demodulated output direction of rotation given actual direction of rotation. FIG. 6 shows the expected direction of the demodulated output for both positive and negative rotation. The points of equal probability occur at the excession threshold frequencies. Alternatively, the signal fringe rates that equate to the maximum and minimum probabilities can also be converted to equivalent instantaneous carrier frequency values by dividing by $2\pi$.

Figure 7:
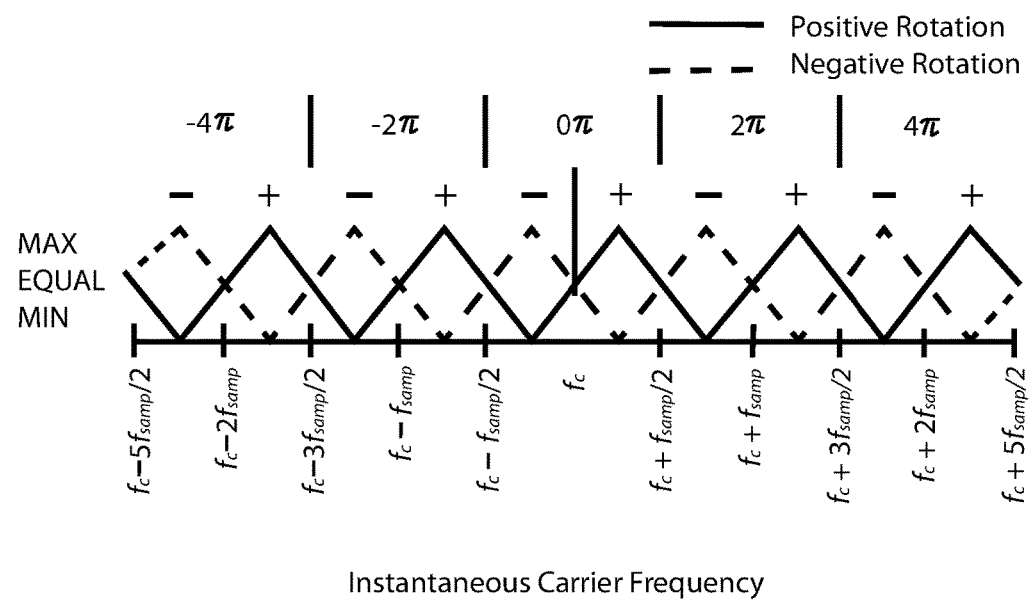
FIG. 7 is an exemplary graphical illustration of excession correction factor boundaries with maximum and minimum likelihood demodulated directions of rotation, according to an embodiment of the invention.

According to step $422_A$, these frequencies are overlaid with the correction factor boundaries shown previously in FIG. 5. The result is FIG. 7, which is an exemplary graphical illustration of excession correction factor boundaries with maximum and minimum likelihood demodulated directions of rotation. As can be seen, the maximum and minimum likelihood points occur at frequencies between the excession threshold frequencies. It can also be seen that from one maximum to the next, or from one minimum to the next, for a given rotational direction, the total bandwidth is twice the bandwidth between excession threshold frequencies.

According to step $422_A$, this increase in bandwidth is used to reduce ambiguity in selecting the appropriate correction factor when the demodulated output direction of rotation is in one direction, but the measured instantaneous carrier frequency falls between excession threshold frequencies where the expected direction of rotation is opposite. Both the maximum and minimum likelihood frequencies are used to establish the correction factor bands and in determining the optimal frequencies within the system bandwidth to track. This ultimately determines a more accurate correction factor, based on the initial correction factors shown in FIG. 5.

Step $422_B$ involves determining a more accurate correction factor, by determining which predetermined maximum/minimum likelihood bin the measured instantaneous carrier frequency is in for a particular sample, as per step $422_A$. At step $422_B$ a determination of tracking frequencies is performed as outlined below. It is not possible to measure or compute a fast Fourier transform (FFT) for every frequency within the carrier signal bandwidth because of the computing power/speed that would be required. Thus, according to step $422_B$ certain frequencies are selected within the instantaneous carrier signal bandwidth of the demodulator to provide a reasonable determination of the instantaneous carrier frequency. It should be noted that only select frequencies within the spectrum of the system must be measured. The select frequencies or frequency bands that should be tracked is dependent on the frequency tracking method itself. According to step $422_B$, there are two primary types of frequency tracking methods: those with continuous tracking ranges; and, those which track discrete frequencies.

The Digital Instantaneous Frequency Measurement (DIFM) approach is an example of a frequency discrimination method with a continuous tracking range. The $y_{out}$ value of the DIFM receiver can range in value between $\pm 1$. The magnitude of the output is directly related to the instantaneous carrier frequency and, as such, can be used to track any frequency within the designed bandwidth of the receiver. For frequency tracking methods that have continuous output ranges, the dynamic range extension approach will place the measured frequency into one of a number of designated frequency bands, which relate to specific correction factors. These bands are generally established by the excession threshold frequencies.

The DIFM dynamic range extension uses two specific sets of frequency bands. One set is used for determining the correction factor given a positive rotation demodulated output, while the other is used for a negative rotation demodulated output. The positive rotation frequency bands are established between the positive rotation minimum likelihood frequencies. The negative rotation frequency bands are established between the negative rotation minimum likelihood frequencies. The step $422_B$ DIFM method of establishing the correction factor boundaries based on the demodulated output direction increases the effective bandwidth of the correction factor bands by a factor of two over using the excession threshold frequencies alone. Other continuous output tracking methods, such as Period Expansion/Contraction Measurement (PECM), would also follow this same approach in selecting tracking frequencies.

The minimum likelihood frequencies, for both positive and negative rotation, can be determined from equations 3.1 and 3.2. These frequencies can then be translated to specific DIFM $y_{out}$ values to be used directly in the dynamic range extension process.

$$f_p(m) = f_c - f_{samp}/4 + mf_{samp} \text{ for } m=0,\pm 1,\pm 2, \ldots \quad (3.1)$$

$$f_n(m) = f_c - (3/4)f_{samp} + mf_{samp} \text{ for } m=0,\pm 1,\pm 2, \ldots \quad (3.2)$$

The step $422_B$ dynamic range extension process due to the determination or selection of a more accurate correction factor via DIFM frequency tracking is an efficient and effective technique. Proper selection of the excession correction factor requires two pieces of information: the demodulated output direction of rotation; and, the averaged instantaneous carrier frequency. The demodulated output direction of rotation is used to narrow down the potential locations of the correction factor and increase the bandwidth of the measurement frequency bands by a factor of two.

When the demodulated output direction of rotation is positive, then the location of the averaged instantaneous carrier frequency will be determined relative to the minimum likelihood positive rotation frequency bands. Likewise, when the direction of rotation is negative, then the location will be determined relative to the minimum likelihood negative rotation frequency bands. The frequency band in which the carrier falls will determine the excession correction factor. The correction factor bands, along with the maximum and minimum likelihood frequencies, may also be seen in FIG. 7.

As outlined above, according to step $422_B$, there are two primary types of frequency tracking methods: those with continuous tracking ranges, such as DIFM outlined above; and, those which track discrete frequencies. The Discrete Fourier Transform (DFT) frequency measurement approach tracks discrete frequencies. With this approach, the Fourier coefficients of the specific frequencies within the carrier bandwidth are measured and compared to one another. The more bandwidth that is measured, the more dynamic range that can be gained. The largest coefficient is selected as the instantaneous carrier frequency, determining which excession correction factor is selected.

Like the DIFM approach, two sets of frequencies will still need to be monitored. The set that is used depends on the demodulated output direction of rotation. For positive rotation demodulated output values, the DFT frequencies that must be tracked are those at the maximum likelihood positive rotation locations. Likewise, the negative set of frequencies to be tracked is those at the maximum likelihood negative rotation direction locations. The step $422_B$ DFT process is done to increase the bandwidth of the correction factor selection bands.

With the DFT method, the number of Fourier coefficients that must be computed is determined by the bandwidth requirement of the dynamic range extension approach and the sampling rate of the system. The frequencies defining the positive and negative bands may be determined from equations 3.3 and 3.4.

$$f_p(m) = f_c + f_{samp}/4 + m f_{samp} \text{ for } m=0, \pm 1, \pm 2, \ldots \quad (3.3)$$

$$f_n(m) = f_c + f_{samp}/4 + m f_{samp} \text{ for } m=0, \pm 1, \pm 2, \ldots \quad (3.4)$$

The step $422_B$ dynamic range extension process via DFT frequency tracking, as the case with DIFM frequency tracking, is also an efficient technique. Proper selection of the excession correction factor again requires two pieces of information: the demodulated output direction of rotation; and, the averaged instantaneous carrier frequency. The difference between the two methods is in how the averaged instantaneous carrier frequency is determined. With the DIFM approach, the carrier measurement bands were defined by the minimum likelihood frequencies. With DFT, the instantaneous carrier frequency is determined by measuring the DFT coefficients at the maximum likelihood frequencies. The previous and current measurements are averaged together to provide an averaged instantaneous carrier frequency. The DFT frequency with the largest averaged coefficient is then used to select the appropriate correction factor.

As stated above, step $422_C$ involves determining a more accurate correction factor. At step $422_C$ a frequency averaging is performed, as outlined below. Step $422_C$ is applied to the measured instantaneous carrier frequency of $422_B$ (either by the continuous DIFM method or the discrete DFT method), which is averaged between several measurement points in order to smooth out the measured instantaneous carrier frequencies before determining in which bin the value falls, thereby determining the correction factor. Since the actual frequency of the carrier will vary between two demodulator phase measurements, it is advantageous to determine what the average frequency is between the two. As outlined below, this is done by adding the previous frequency to the current frequency and dividing by two.

Selecting the correction factor based solely on the location of the instantaneous carrier frequency within the spectrum will lead to a high error rate. The measured instantaneous carrier frequency only provides the angular velocity at the time of the current demodulation sample point. It does not account for the angular velocity changes that have occurred since the previous demodulation point. For high fringe rate signals, the change in angular velocity between points can be significant. In particular, the minimums, maximums, and inflection points of sinusoidal signals can all be problematic. Such errors, however, can largely be mitigated by considering the instantaneous frequency or angular velocity at the previous demodulation point.

A two-point, equally-weighted, instantaneous carrier frequency average has been determined to substantially reduce potential errors in correction factor selection. There is, however, a frequency dependency that must be considered. As the frequency of the input signal increases, the number of demodulation samples per cycle is reduced. If the number of samples becomes too few, then averaging will fail to determine an accurate averaged angular velocity, and the selected correction factor will likely be in error. For full dynamic range extension, a minimum of 8-12 samples per sinusoidal cycle are required, depending on the frequency measurement technique utilized. A reduced dynamic range extension is possible with fewer data points. The data from the frequency averaging process outlined above is used to determine an excession correction factor that is added to the standard demodulated output at step 230.

More complex averaging techniques may provide improved angular velocity tracking capabilities. Potential improvements include multipoint and weighted averages. One high potential approach is a weighted three-point average that utilizes the previous, the current, and the following demodulation points. This requires delaying the correction factor selection by one demodulation point but may be easily achieved. Such an approach would beneficially handle higher fringe rate inflection points.

It should be noted, as stated above, more accurate correction factors are determined by progressing through steps $422_A$, $422_B$, and $422_C$, which combine to produce a value that is employed in step 230. This final, more accurate correction factor may then be introduced to the standard demodulator to mitigate errors. As outlined above, $422_B$ may be performed by a continuous DIFM method or a discrete DFT method, both methods affecting the overall efficiency of the system. It has been found that with both the DIFM and the DFT, the correction factor produced by steps $422_A$, $422_B$, and $422_C$ results in increasing the dynamic range. When $422_B$ implements the DIFM dynamic range extension method, the dynamic range increase is about 20 dB to about 26 dB, depending on the available bandwidth of the carrier signal. Also, when $422_B$ implements the DFT dynamic range extension method, the dynamic range increase is about 20 dB or more. However, increases beyond 20 dB require increased hardware processing requirements that doubles for each additional 6 dB dynamic range increase. The DIFM dynamic range extension method does not have these hardware resource limitations for the extensions that are greater than 20 dB.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A method of extending the dynamic range in a heterodyne fiber-optic interferometer via an instantaneous carrier measurement, the method comprising:

providing a heterodyne fiber-optic interferometer having a demodulator and an associated carrier frequency;
determining demodulator excessions;
determining a correction factor based on the detected demodulator excession, wherein each of the detecting of the demodulator excessions and the determining of a correction factor is based on information from an instantaneous carrier frequency; and
introducing the correction factor to the demodulator to mitigate errors, thereby extending the dynamic range of the heterodyne fiber-optic interferometer,
wherein the determining of demodulator excessions comprises:
  using the instantaneous carrier frequency to determine the instantaneous direction of phase rotation; and
  using the instantaneous carrier frequency to determine the instantaneous angular velocity, wherein each of the determined instantaneous direction of phase rotation, and the determined instantaneous angular velocity are used to determine the demodulator excessions, and
wherein the determining of demodulator excessions comprises:
  measuring the instantaneous carrier frequency; and
  from the measured instantaneous carrier frequency, deriving the angular velocity of an incoming signal associated with the instantaneous carrier frequency, by utilizing a sample rate times $\pi$ ($\pm \pi f_{samp}$), wherein said sample rate times $\pi$ ($\pm \pi f_{samp}$) occur when said angular velocity is greater than that of the demodulator,
wherein the determining of a correction factor based on the detected demodulator excession comprises establishing initial correction factors from:

$f_e(m) = f_c + m/2(f_{samp})$ for $m = \pm 1, \pm 2, \ldots$, wherein $f_c$ is the instantaneous carrier frequency, $f_e$ is the instantaneous carrier frequency at the excession crossing, and $f_{samp}$ is the sample frequency.

2. The method of extending the dynamic range of claim 1, wherein the determining of a correction factor based on the detected demodulator excession further comprises:
  determining a final correction factor that is more accurate than the initial correction factor by applying a maximum and minimum likelihood of demodulated rotational direction approach, wherein said maximum and minimum likelihood of demodulated rotational direction is a direction the demodulator determines when the instantaneous carrier frequency signal has a constant angular rate between two phase movements, thereby establishing predetermined maximum/minimum likelihood bins for the instantaneous carrier frequency.

3. The method of extending the dynamic range of claim 2, wherein the determining the final correction factor that is more accurate than the initial correction factor comprises, determining which of the predetermined maximum/minimum likelihood bins the measured instantaneous carrier frequency is in for a particular sample by determining tracking frequencies, wherein predetermined frequencies are selected within a bandwidth of the carrier frequency signal to provide a reasonable determination of the instantaneous carrier frequency.

4. The method of extending the dynamic range of claim 3, wherein said predetermined selected frequencies are selected based on continuous tracking ranges by using a Digital Instantaneous Frequency Measurement (DIFM) approach.

5. The method of extending the dynamic range of claim 4, wherein the DIFM dynamic range extension approach uses two specific sets of frequency bands, a first set for determining the correction factor given a positive rotation demodulated output, and a second set for a negative rotation demodulated output.

6. The method of extending the dynamic range of claim 3, wherein said predetermined selected frequencies are selected based on discrete frequencies by using a Discrete Fourier Transform (DFT) frequency measurement approach, wherein Fourier coefficients of specific frequencies are measured and compared to one another.

7. The method of extending the dynamic range of claim 6, wherein the DFT approach uses two specific sets of frequency bands, a first set for determining the correction factor given a positive rotation demodulated output, and a second set for a negative rotation demodulated output.

8. The method of extending the dynamic range of claim 5, wherein the determining the final correction factor that is more accurate than the initial correction factor comprises:
  determining a final correction factor that is more accurate than the initial correction factor by frequency averaging, wherein a previous frequency is added to the current frequency, the sum thereof is divided by 2.

9. The method of extending the dynamic range of claim 7, wherein the determining the final correction factor that is more accurate than the initial correction factor comprises:
  determining a final correction factor that is more accurate than the initial correction factor by frequency averaging, wherein a previous frequency is added to the current frequency, the sum thereof is divided by 2.

* * * * *